United States Patent
Lebrun et al.

(10) Patent No.: US 9,988,158 B2
(45) Date of Patent: Jun. 5, 2018

(54) AIRCRAFT LOAD SHEDDING SYSTEM INCLUDING SUPPLEMENTARY POWER SOURCES FOR ASSURING DC AND DEVICE FOR CUTTING OFF POWER TO THE ALTERNATORS OF A TURBINE ENGINE DURING ACCELERATION

(71) Applicant: SNECMA, Paris (FR)

(72) Inventors: Arnaud Lebrun, Noisy sur Ecole (FR); Thomas Lepage, Paris (FR); Darragh McGrath, Issy les Moulineaux (FR)

(73) Assignee: SNECMA, Paris (FR)

( * ) Notice: Subject to any disclaimer, the term of this patent is extended or adjusted under 35 U.S.C. 154(b) by 109 days.

(21) Appl. No.: 14/785,124

(22) PCT Filed: Apr. 22, 2014

(86) PCT No.: PCT/FR2014/050977
§ 371 (c)(1),
(2) Date: Dec. 4, 2015

(87) PCT Pub. No.: WO2014/174207
PCT Pub. Date: Oct. 30, 2014

(65) Prior Publication Data
US 2016/0083106 A1 Mar. 24, 2016

(30) Foreign Application Priority Data
Apr. 22, 2013 (FR) ...................... 13 53659

(51) Int. Cl.
*B64D 41/00* (2006.01)
*H02J 7/34* (2006.01)
(Continued)

(52) U.S. Cl.
CPC .............. *B64D 41/00* (2013.01); *F01D 15/10* (2013.01); *H02J 4/00* (2013.01); *H02J 7/1415* (2013.01);
(Continued)

(58) Field of Classification Search
CPC ..... B64D 2221/00; B64D 41/00; F01D 15/10; F05D 2220/323; H02J 2007/143;
(Continued)

(56) References Cited

U.S. PATENT DOCUMENTS

| 5,977,645 A | 11/1999 | Glennon |
| 6,124,646 A * | 9/2000 | Artinian ................. B64D 13/06 290/52 |

(Continued)

FOREIGN PATENT DOCUMENTS

| WO | WO 99/00884 A1 | 1/1999 |
| WO | WO 2012/012482 A1 | 1/2012 |
| WO | WO 2013/029085 A1 | 3/2013 |

OTHER PUBLICATIONS

International Search Report dated Jul. 30, 2014, in PCT/FR2014/050977 filed Apr. 22, 2014.

*Primary Examiner* — Tulsidas C Patel
*Assistant Examiner* — S. Mikailoff
(74) *Attorney, Agent, or Firm* — Oblon, McClelland, Maier & Neustadt, L.L.P.

(57) ABSTRACT

A DC electrical generation system for an aircraft propelled by a turbine engine, such as a turbojet, includes at least one electrical energy storage capacity, at least one generator driven mechanically by a rotation shaft of the turbine engine and electrical connections between the electrical energy storage capacity, the generator and the aircraft equipment for powering the above-mentioned equipment with DC current, also including at least one alternative for supplying DC
(Continued)

current to the equipment, which are autonomous in relation to any mechanical driving by a rotation shaft of the turbine engine, and a device that can cut-off power to the generator(s) and simultaneously activate the alternative current supply. The power cut-off device for triggering power cut-off and activating the alternative current supply is controlled by a control or operating parameter of the turbine engine. The alternative current supply is preferably formed by one or more supercapacitors.

5 Claims, 2 Drawing Sheets

(51) Int. Cl.
*H02J 4/00* (2006.01)
*H02J 7/14* (2006.01)
*F01D 15/10* (2006.01)
*H02K 7/18* (2006.01)
*H02P 9/00* (2006.01)
*H02P 9/48* (2006.01)

(52) U.S. Cl.
CPC .......... *H02J 7/1423* (2013.01); *H02J 7/1446* (2013.01); *H02J 7/345* (2013.01); *H02K 7/1823* (2013.01); *H02P 9/008* (2013.01); *H02P 9/48* (2013.01); *B64D 2221/00* (2013.01); *F05D 2220/323* (2013.01); *H02J 2007/143* (2013.01); *Y02T 50/44* (2013.01)

(58) Field of Classification Search
CPC .......... H02J 4/00; H02J 7/1415; H02J 7/1423; H02J 7/1446; H02J 7/345; H02K 7/1823; H02P 9/008; H02P 9/48; Y02T 50/44
See application file for complete search history.

(56) References Cited

U.S. PATENT DOCUMENTS

| 9,735,578 | B2* | 8/2017 | Yoshiguchi | H02J 3/14 |
| 2002/0109952 | A1* | 8/2002 | Rapsinski | H02H 9/042 361/86 |
| 2010/0109581 | A1* | 5/2010 | Sheahan, Jr. | B60L 7/14 318/376 |
| 2010/0204848 | A1* | 8/2010 | Botura | B64D 15/12 700/295 |
| 2012/0181856 | A1 | 7/2012 | Sheahan, Jr. et al. | |
| 2014/0084817 | A1 | 3/2014 | Bhavaraju et al. | |
| 2014/0125121 | A1* | 5/2014 | Edwards | H02J 7/1446 307/9.1 |
| 2014/0297155 | A1* | 10/2014 | Chen | F02C 9/28 701/100 |
| 2014/0338352 | A1* | 11/2014 | Edwards | F02C 3/113 60/774 |
| 2015/0045978 | A1* | 2/2015 | Yoshiguchi | H02J 3/14 700/295 |
| 2015/0123463 | A1* | 5/2015 | Huang | F01D 15/10 307/9.1 |
| 2016/0083106 | A1* | 3/2016 | Lebrun | B64D 41/00 290/7 |
| 2017/0063151 | A1* | 3/2017 | Freitag | H02J 3/14 |

* cited by examiner

AIRCRAFT LOAD SHEDDING SYSTEM INCLUDING SUPPLEMENTARY POWER SOURCES FOR ASSURING DC AND DEVICE FOR CUTTING OFF POWER TO THE ALTERNATORS OF A TURBINE ENGINE DURING ACCELERATION

The present invention relates to the field of turbine engines and more particularly to that of systems for providing power to the equipment of the aircraft on which said systems are installed.

Apart from during the start-up phase, the equipment of an aircraft is typically supplied with electric power by drawing power from the engine(s) which ensure(s) the propulsion thereof. Said power is generated by generators commonly known as variable frequency generators (VFG) or integrated drive generators (IDG), which are mechanically driven by a shaft which engages on one of the rotors of the turbine engine. Drawing this power affects the thermodynamic operation of the engine, and it is desirable to optimise the overall generation of electric power on the aircraft in order to optimise the design of the turbine engine.

In the case of recent aeroplanes, the tendency has been, on one hand, towards reducing the size of the high-pressure body of the turbojet engines so as to increase the bypass ratio and the propulsion efficiency, without increasing the overall diameter, and on the other hand, towards increasing the electrical requirements. Said requirements arise in particular from various functions (de-icing the air inlets, the wings or the tail unit, cabin air conditioning, etc.) changing from a pneumatic supply to an electrical supply.

This results in an increase in the mechanical power to be provided to the electric power generation system in relation to the total power provided by the high-pressure (HP) turbines of the turbojet engines. However, increasing the mechanical power drawn from the HP shaft to power the generators leads to an increase in the surge margin requirement of the HP compressor. It is desirable to find other means for providing the electric power required by the aircraft, especially during speed changes, during which the working point of the turbine engine is at its closest to the pumping line of the high-pressure compressor.

The object of the present invention is to overcome these drawbacks by proposing optimum control for providing electrical energy on an aircraft.

In this respect, the invention relates to an electric power generation system for supplying current to at least one piece of equipment for an aircraft propelled by a turbine engine, comprising at least one capacitor for storing electrical energy, at least one current generator designed to be mechanically driven by a rotary shaft of the turbine engine, and electrical connections between said storage capacitor, said generator and the equipment of the aircraft in order to supply said equipment with current, and comprising at least one alternative means for providing said equipment with direct current, which means is autonomous with respect to any mechanical driving by a rotary shaft of the turbine engine, and a load shedding device capable of shedding the load of the generator(s) and of simultaneously activating said alternative means, characterised in that said load shedding device is controlled by a control parameter or an operation parameter of the turbine engine.

More particularly, the load shedding device is activated by an instruction to increase the speed of the turbine engine.

Shedding the load of the generators, i.e. stopping them from providing electric power, eliminates the withdrawal of mechanical power, which they perform during normal operation, from the rotary shaft of the turbine engine, and makes it possible to increase the turbine engine speed having an optimised surge margin for the compressor. The supply of power is thus ensured by the alternative means for providing current, which take over to power the aeroplane equipment (or engine equipment) during this load shedding period.

Preferably, the load shedding device activates said load shedding and said alternative activation during an increase in the rotational speed of the turbine engine, the rotational speed increase being greater than a predetermined value. Said value, above which the load shedding device becomes active, is selected on the basis of the surge margin requirements during a speed acceleration.

Advantageously, said acceleration is an acceleration between the idling speed and full throttle.

In a particular embodiment, the alternative means is a device for storing electrical energy connected to a bus for distributing continuous current via a switch.

Advantageously, the storage device is formed by at least one supercapacitor. This type of device has the advantage of providing a high current density associated with short discharge times.

Preferably, said load shedding device is designed to make said generator(s) operate beyond their nominal function on request, in order to ensure that said storage device is charged.

More preferably, said generator operates at a speed equal to 120% of its nominal value as soon as said alternative means for supplying direct current is stopped. Yet more preferably, said generator operates at a speed equal to 150% of its nominal value for a period of less than 30 seconds.

The invention thus recommends using the allowable overboost margins for the variable frequency generators or integrated drive generators, in order to charge the supercapacitors or equivalent devices in flight.

The invention also relates to a turbine engine equipped with an electric power generation system as described above.

In a particular embodiment of this turbine engine, the capacitor of said alternative means and the overboost operation of said generator are designed to ensure two sequential cycles of current provision by said alternative means and of charging by said generator, said two cycles corresponding to an acceleration from the idling speed to full throttle followed immediately by a deceleration from full throttle to idling speed, the acceleration and deceleration rates being equal to the maximum rates allowable by regulations.

The invention will be better understood, and its other details, features and advantages will become clearer on reading the following detailed explanatory description of an embodiment of the invention, given as a purely illustrative and non-limiting example, with reference to the accompanying schematic drawings, in which.

Figure 1:
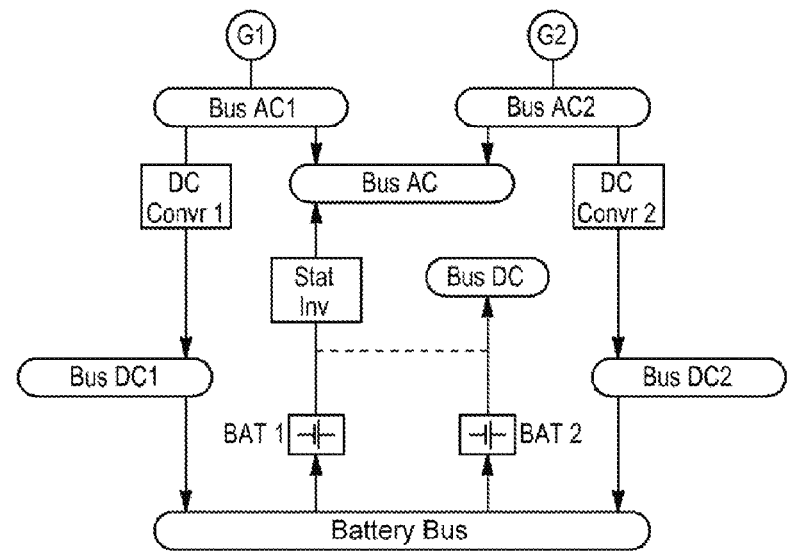
FIG. 1 is a schematic view of an electrical circuit of an aircraft, according to the prior art.

FIG. 1 shows the traditional electrical circuit of an aircraft, such as a twin-engine jet aircraft. Each engine drives a variable frequency generator, denoted respectively by G1 and G2, which supplies an alternating current which is then distributed across the aeroplane by means of an AC bus Bus AC 1 and Bus AC 2. These two buses power a single AC bus Bus AC to which the various pieces of equipment of the aeroplane are connected, said pieces of equipment being consumers of AC electric power.

Furthermore, the aeroplane has two batteries BAT 1 and BAT 2 which supply DC current to an electric bus, referred to here as Bus DC, to which the various pieces of equipment of the aeroplane are connected, said pieces of equipment in turn being consumers of DC electrical energy. In addition, a DC-AC current converter Stat Inv allows the batteries BAT 1, BAT 2 to supply alternating current to the Bus AC.

To recharge these batteries, the generators G1 and G2 feed alternating current to the converters DC Conv 1 and DC Conv 2, which deliver direct current to DC buses, referred to as Bus DC 1 and Bus DC 2. These two buses DC 1, DC 2 are then connected to a single bus, denoted here Battery Bus, which transmits the energy received to the two batteries to ensure they are recharged.

Figure 2:
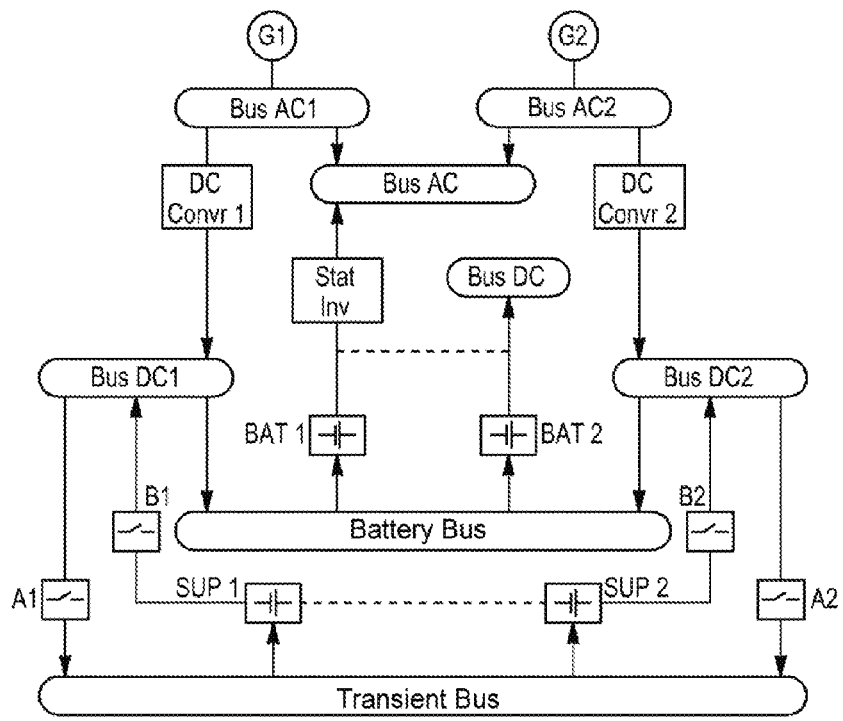
FIG. 2 is a schematic view of an electrical circuit of an aircraft, according to an embodiment of the invention.

FIG. 2 shows the same electrical circuit, to which elements have been added to produce the invention. Two additional energy sources have been added, which are each connected to one of the engines and produced in the form of two supercapacitors or heavy-duty batteries, SUP 1 and SUP 2. One advantage of using supercapacitors is the increased service life thereof: they can tolerate a great number of usage cycles corresponding to usage on board an aircraft. Said supercapacitors are connected to the DC bus Bus DC1 or Bus DC2 of the corresponding engine via a switch, referred to as a transient switch, B1 and B2, respectively. Closing these switches in the event of a temporary request for increased electric power causes the energy stored in the supercapacitors to be discharged, firstly into the DC buses DC1 and DC2 and then into the Battery Bus, where said power supplements the batteries BAT 1 and BAT 2 in order to supply energy, via the Bus DC, to the equipment which uses direct current.

Supercapacitors are recharged by drawing the current present at the DC buses DC1 and DC2 when the request for extra power has finished, in order to power a specific recharging bus, denoted here as Transient Bus, to which the supercapacitors SUP 1 and SUP 2 are connected. To this end, two switches, referred to as recharging switches, A1 and A2, respectively, are placed between the DC buses DC1 and DC2, respectively, and the Transient Bus to enable this recharging.

Figure 3:
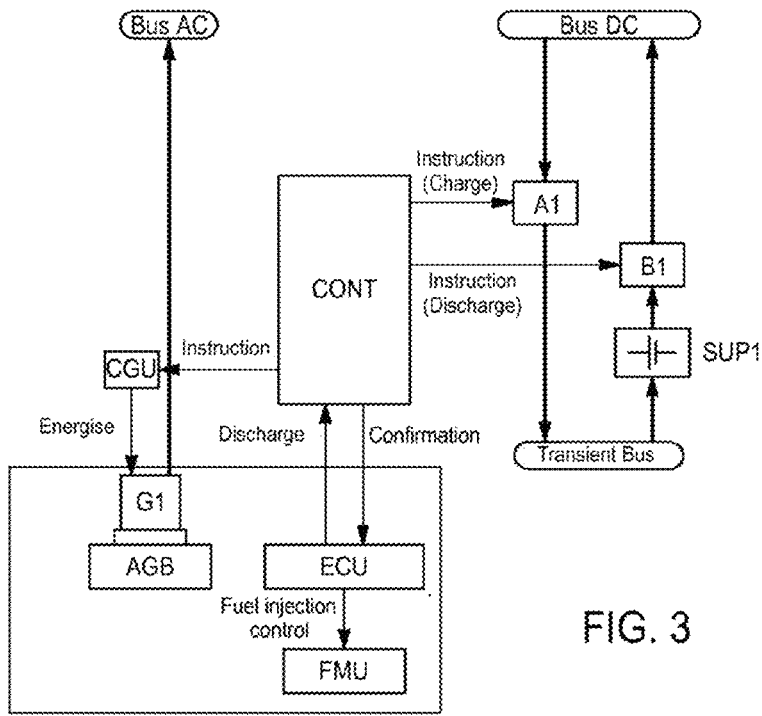
FIG. 3 shows a control diagram of the electrical circuit of FIG. 2.

FIG. 3 shows the electrical control system according to the invention for the different pieces of equipment involved in providing current. This figure only shows equipment associated with just one turbojet engine, but other similar pieces of equipment are naturally associated with each of the aircraft engines.

The turbojet engine shown typically comprises a control computer ECU which controls the position of a fuel metering device FMU for adjusting the rotational speed thereof. The rotary shaft of this turbojet engine mechanically drives an accessory gear box AGB which contains, inter alia, a variable frequency generator G1.

The aircraft conventionally contains an electric power supply controller CONT which is responsible for activating or deactivating the different pieces of equipment which are designed to provide alternating or direct electrical current to the various pieces of equipment which consume electrical energy. This power supply controller is firstly connected to the engine computer ECU which can send a request (denoted by 'discharge' in the figure) to said controller in order to trigger load shedding, and to which the controller can provide an acknowledgement of receipt (denoted by 'con- firmation' in the figure) and possibly an acknowledgement that this has been executed correctly. Said controller is then connected to transient switches of the switch type B1 in order to both enable or terminate the provision of power by the supercapacitor SUP1 and recharging switch A1, and to enable or terminate the charging of the supercapacitor for the bus DC. The controller is finally linked to the driver CGU of this generator G1 so that said generator is reactivated, by means of an energising current being sent, following a shutdown.

The electrical currents as shown in FIG. 2, whether they are generated by the supercapacitor SUP 1 or the generator G1 via a converter, are then provided to the DC bus DC1 to be recovered by the aircraft equipment or possibly by the engine equipment, depending on the requirements thereof.

Figure 4:
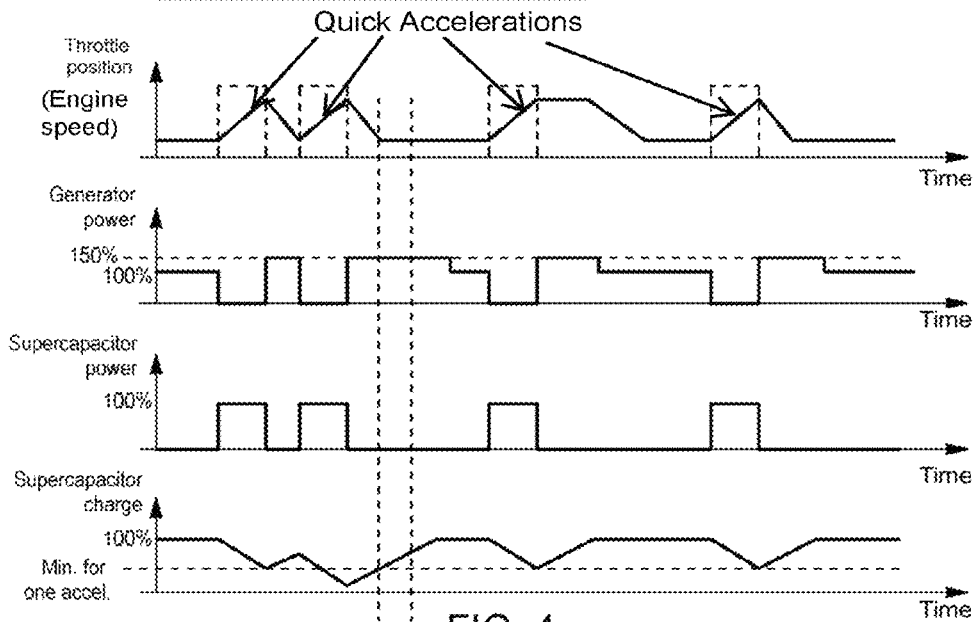
FIG. 4 is a diagram showing the changes of the electric power supply by the various pieces of equipment during speed changes.

FIG. 4 shows the development of the electrical energy supply by the various pieces of equipment of the invention, during successive changes in the speed of the turbojet engine. The first curve shows the development over time of the position of the throttle control lever, whether said lever is controlled by an auto-throttle or by the pilot, and the resultant developments of the engine speed based on the throttle position. The curve corresponds to a series of four quick accelerations from idling speed to full throttle, followed by rapid decelerations, the two first accelerations-decelerations being carried out immediately one after the other. These two first cycles are then followed by a cycle formed by an acceleration with a speed stabilization followed by a deceleration, then by an acceleration cycle followed immediately by a deceleration.

The second curve corresponds to the power drawn from the variable frequency generator G1 during the different cycles set out above. This power is set at zero during the acceleration phases of the turbojet engine speed, and then, during the subsequent deceleration, brought to 150% of the maximum value that said turbojet engine has during normal usage. This type of usage is indeed possible since the generators are designed to be able to operate at ratios of approximately 1.5 times their nominal power for periods of approximately five minutes. The invention therefore proposes taking advantage of this ability by making the generator supply at least 120% and preferably up to 150% of its nominal power for a period of less than approximately 30 seconds, and preferably less than 20 seconds. During this period, there is thus a 50% power surplus which is available for recharging the supercapacitors. Following this period of use above the nominal power, the drawn power is brought back to 100% of its nominal value as soon as the supercapacitors are recharged, as long as no new quick acceleration is required of the turbojet engine.

The third curve shows the power supplied by the supercapacitors during these phases. This power is likewise always at zero, apart from during the rapid accelerations, during which the power supplied by said supercapacitors is equal to 100% of the nominal value of the variable frequency generators for which said supercapacitors are responsible for compensating.

Lastly, the fourth curve plots the energy available in the supercapacitor as a function of time, taking account of said supercapacitor being discharged during the acceleration phase and being recharged by the extra power drawn from the generators following the acceleration. The curve also shows, in dotted lines, the minimum charge value above which an acceleration can be initiated when the power has stopped being drawn from the generator VFG, without the equipment having an insufficient power supply. This drawing shows a system design in which it is only possible to initiate two successive complete accelerations followed by rapid decelerations.

The functioning of a system according to the invention for controlling the electric power supply of aircraft equipment which consumes direct current will now be described.

A rapid acceleration cycle followed by a rapid deceleration takes place in the following manner:

Since the aircraft has to remain the master of the electrical network control, the engine computer cannot influence the electric power generation system by itself. It is thus provided that said computer sends a corresponding request to the computer CONT controlling the electrical network. Once an acceleration request is received by the auto-throttle or by the pilot, the engine calculator ECU determines, by means of the power control thereof, that it has to accelerate and it sends a request to the aeroplane controller to discharge the electric generator(s) which are driven mechanically by the engine. The power drawn from the turbine engine by the electric generator(s) is then zero.

The invention provides that only the DC network is powered during the transient period. The control computer of the aeroplane then cuts off the current for energising the generators G1 and G2, and instead switches over to DC electrical generation at the supercapacitors SUP1 and SUP2 by actuating the transient switches B1 and B2. These supercapacitors supplement the current provided to the buses Bus DC1 and DC2 and eventually to the equipment, which is no longer powered by the generators G1 and G2 by means of the converters CONV 1 and CONV 2.

Once the acceleration has finished, the engine computer ECU sends a piece of information to the aeroplane controller CONT, which can then restart the generators G1 and G2 by reactivating the energising current. This is thus the normal configuration, but with partially discharged supercapacitors.

To remedy this, once the generators are restarted, the aeroplane controller CONT instructs said generators to configure themselves to supply an amount of energy equal to 150% of their nominal value, and closes the recharging switches A1 and A2. The 50% power surplus thus generated, which is not absorbed by the pieces of equipment which consume direct current, enters the Transient Bus and recharges the supercapacitors. After a relatively short time, the supercapacitors are adequately recharged to permit a series of two successive accelerations and the aeroplane controller can stop the request for exceptional power supply and return the generators G1 and G2 to their nominal value of 100%.

The principle of the invention thus consists in replacing the generators, during transient phases of operation of the engine, called "transients" for short. The transient usage phases are phases during which the operating speed of the engine changes. The transient usage phases are particularly demanding on the turbojet engine, the provision of DC electric power, which is conventionally ensured by variable frequency generators or other generators, by a system which is or is not specifically designed to store electrical energy.

The invention requires the start of the transient engine phases to be detected reliably in order to anticipate the load shedding of the drawn power. This detection is carried out by the ECU by using a change in the engine speed setpoint (engine setpoint for the high-pressure/low-pressure bodies of the engine, for example), which can come from the control lever, the auto-throttle, or automatic speed change setpoints from the ECU. In particular, the detection is quick enough to allow load shedding of the drawing of power from the engine before the acceleration of the engine.

By acting on the transient switches B1 and B2, the aeroplane controller, which forms the load shedding device CONT, orders load shedding of the generators G1 and G2 during the transient phase, and this eases the operation of the turbine engine during this period since the mechanical power has stopped being drawn from the shaft. During the transient period, the DC bus is thus powered by dedicated batteries or supercapacitors SUP 1 and SUP 2.

Load shedding of the mechanical power drawn from the jet engine allows the number of design restrictions on the turbine engine to be reduced, in particular on the surge margin requirement of the compressor during the accelerations. By making it possible to optimise the design of the compressor, the compression output can thus be improved, the size of the HP body can be reduced (if power is drawn from the HP shaft), and thus the fuel consumption can be lowered. Incidentally, this change may also allow for a marginal reduction in the weight of the turbojet engine. The net fuel consumption gain for the aeroplane during a flight is thus advantageous, yet only if the extra weight caused by the installation of the additional electrical energy storage system is sufficiently low.

Instead of the electric power from the electrical generators, the electric power provided to the aircraft equipment or engine equipment is preferably provided by supercapacitors which, in the current technology, represent the best candidates in terms of available electrical energy density, with discharge periods of approximately 10 seconds, and this is compatible with the transient operation periods of the turbojet engines.

Furthermore, since the proposal is to power only the DC network during the transient period, it should be noted that the loads which are conventionally placed on the alternating network, e.g. hot plates or ovens, de-icing devices or refrigerators, have a significant level of inertia, which means that their time constant is considerably greater than the maximum transient time in consideration. Thus cutting their electric power supply during the transient phase in question does not represent any particular problem.

The amount of energy stored in the supercapacitors is limited. A recharging device should thus be provided. For this purpose, the electrical energy storage system is recharged during the deceleration of the turbojet engine, which follows the increase in speed thereof, or during a stable operation. The normal electric power generation system is thus called upon for this operation. When there is available energy on the Bus DC, the recharging switches A1 and A2 are closed in order to recharge the supercapacitors. In this regard, a strategy for controlling the priorities is implemented in the electrical controller of the aeroplane which forms the load shedding device CONT, so as to not supply power to the supercapacitors to the detriment of loads assessed as being greater at this moment.

Lastly, load shedding of the mechanical power drawn from the rotary shaft of the turbojet engine could allow the thrust level to be reduced at idling speed. This would then allow the aeroplane's fuel consumption to be reduced, firstly because the turbojet engine, which is rotating more slowly, consumes less during the approach phase, and secondly because the operation profile can be optimised by taking account of this new thrust level.

The invention has been described on the basis of triggering the load shedding of generators and activating supercapacitors during an acceleration from idling speed to full throttle. The invention can also be implemented only during accelerations from a speed greater than or equal to that of idling speed towards a speed lower than or equal to full throttle. It can also be implemented for accelerations which are not carried out in response to sudden movements of the lever, i.e. movements for which the speed acceleration and deceleration rates are the maximums allowed by the ECU controller and by the inherent features of the rotor, but rather those in response to accelerations which are simply greater than a predetermined rate.

In the event that temporary overconsumption is required, for an energy requirement greater than the nominal requirement for a short period, i.e. of the same magnitude as the acceleration phases of approximately 6 seconds, on a generator of the aeroplane electric system, the device according to the invention advantageously allows the mechanical power drawn from the engine to be limited by giving preference to drawing from the supercapacitors. In this case, the discharge requests as shown in FIG. 3 can be fulfilled by a request coming from the control of the aeroplane systems. Other aeroplane systems can control the electric power supply controller and thus make use thereof. The power supply controller can thus receive instructions from systems other than the engine to initiate discharging.

For example, in the case of temporary overconsumption associated with the use of the aeroplane actuators, such as letting down the landing gear or opening flaps or reversers, the device advantageously prevents increased power being drawn from the engine.

The invention claimed is:

1. An electric power generation system for supplying current to a piece of equipment for an aircraft propelled by a turbine engine, the electric power generation system comprising:
 a capacitor for storing electrical energy;
 a current generator designed to be mechanically driven by a rotary shaft of the turbine engine;
 electrical connections between said capacitor for storing electrical energy, said generator, and the piece of equipment of the aircraft in order to supply current to said piece of equipment, the electrical connections including:
  a first DC bus which receives energy from the current generator,
  a battery bus which receives energy from the first DC bus and delivers the energy received from the first DC bus to the capacitor,
  a second DC bus which supplies energy from the capacitor to the piece of equipment of the aircraft,
  a recharging bus which receives current from the first DC bus and is connected to the first DC bus via a first switch,
 an alternative means for providing said piece of equipment with current, the alternative means being autonomous with respect to any mechanical driving by a rotary shaft of the turbine engine, the alternative means being a device for storing electrical energy from current supplied from the recharging bus,
 a second switch which connects the alternative means to the first DC bus, such that the alternative means provides energy to the piece of equipment of the aircraft when the second switch is in a closed position; and
 a power supply controller configured to shed a load of said generator and to simultaneously activate said alternative means,
 wherein said power supply controller is configured to
  when an acceleration of the turbine engine is greater than a predetermined value, stop operation of the generator and close the second switch such that the alternative means provides current to the piece of equipment of the aircraft, and
  when the acceleration of the turbine engine is less than the predetermined value and the alternative means is not fully charged, restart the generator and operate the generator at a speed higher than a nominal operating speed of the generator, open the second switch, and close the first switch so as to charge the alternative means.

2. The electric power generation system according to claim 1, wherein the device for storing electrical energy of the alternative means is formed by at least one supercapacitor.

3. The electric power generation system according to claim 1, wherein said generator operates at a speed equal to 120% of the nominal operating speed of the generator as soon as said second switch is opened.

4. The electric power generation system according to claim 3, wherein said generator operates at a speed equal to 150% of the nominal operating speed of the generator for a period of less than 30 seconds.

5. A turbine engine comprising an electric power generation system according to claim 1.

* * * * *